United States Patent [19]
Folsom

[11] Patent Number: 5,678,405
[45] Date of Patent: *Oct. 21, 1997

[54] CONTINUOUSLY VARIABLE HYDROSTATIC TRANSMISSION

[75] Inventor: Lawrence Ray Folsom, Pittsfield, Mass.

[73] Assignee: Martin Marietta Corporation, King of Prussia, Pa.

[ * ] Notice: The term of this patent shall not extend beyond the expiration date of Pat. No. 5,423,183.

[21] Appl. No.: 418,692

[22] Filed: Apr. 7, 1995

[51] Int. Cl.$^6$ .................................................. F16D 39/00
[52] U.S. Cl. .................. 60/488; 60/492; 60/444; 91/506
[58] Field of Search .................. 60/443, 444, 488, 60/490, 491, 492; 91/506

[56] References Cited

U.S. PATENT DOCUMENTS

| | | | |
|---|---|---|---|
| 3,204,411 | 9/1965 | Stockton | 60/492 |
| 4,493,189 | 1/1985 | Slater | 60/492 |
| 4,896,585 | 1/1990 | Forster | 91/506 |
| 5,423,183 | 6/1995 | Folsom | 60/492 |

*Primary Examiner*—F. Daniel Lopez
*Attorney, Agent, or Firm*—Robert A. Cahill; Geoffrey H. Krauss

[57] ABSTRACT

A continuously variable hydrostatic transmission includes an input shaft connected to drive a hydraulic pump unit, a grounded hydraulic motor unit, and an output shaft. A wedge-shaped swashplate is pivotally mounted to the output shaft in driving connection to receive output torque resulting from the exchange of pressurized hydraulic fluid between the pump and motor units through ports in the swashplate. A hydraulically actuated ratio controller is pivotally linked to the swashplate to selectively adjust the swashplate angle relative to the output shaft axis and thereby change transmission ratio.

23 Claims, 4 Drawing Sheets

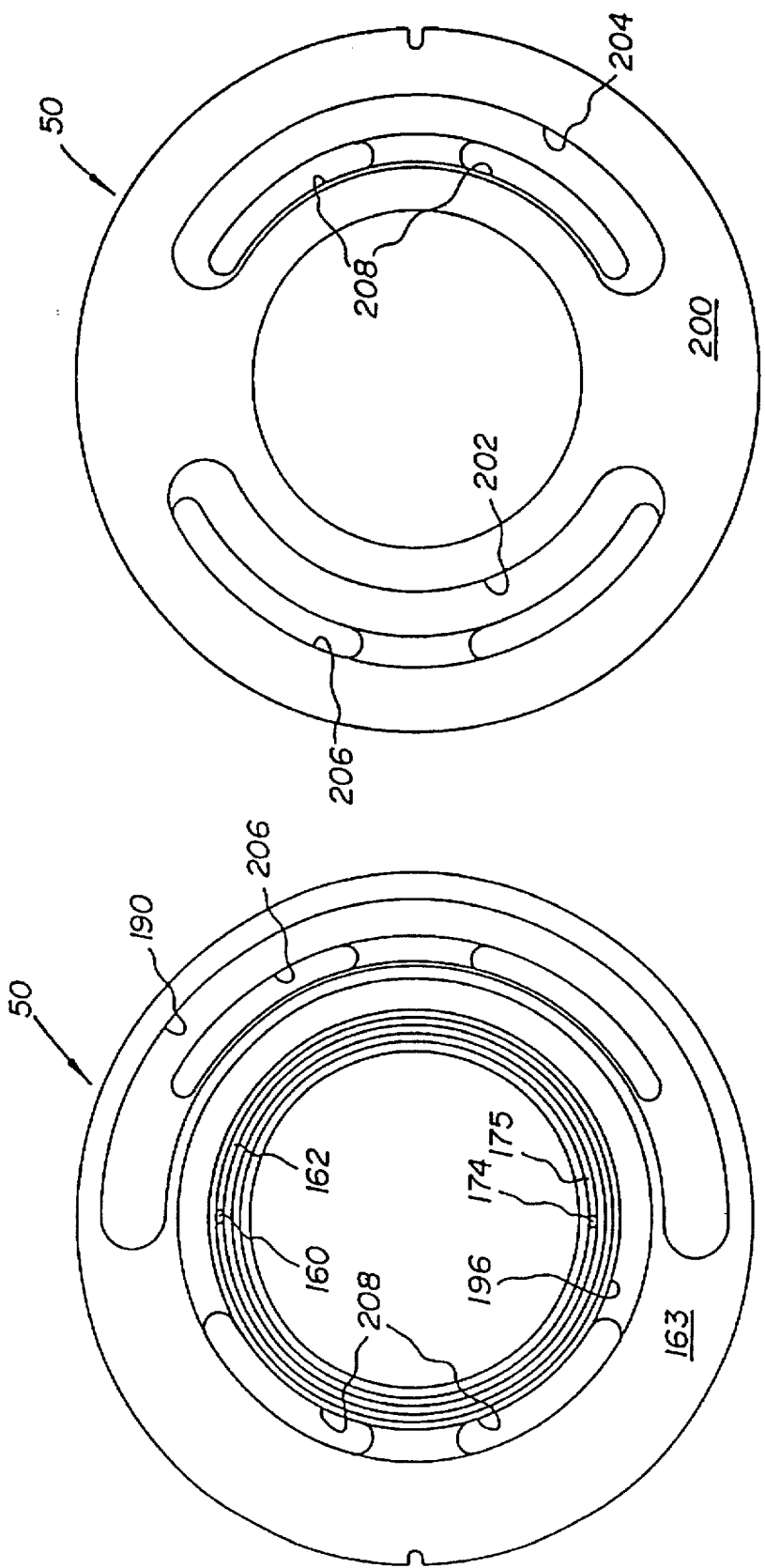

CONTINUOUSLY VARIABLE HYDROSTATIC TRANSMISSION

REFERENCE TO RELATED APPLICATIONS

The invention disclosed in this application has particular, but not necessarily limited, application to the continuously variable hydrostatic transmissions disclosed in copending U.S. patent applications, Ser. Nos. 08/093,192, filed Jul. 13, 1993; 08/333,688, filed Nov. 3, 1994; and 08/342,472, filed Nov. 21, 1994. The disclosures of these applications are incorporated herein by reference.

FIELD OF THE INVENTION

The present invention relates to hydraulic machines and, more particularly, to hydrostatic transmissions capable of transmitting power from a prime mover to a load at continuously (infinitely) variable transmission ratios.

BACKGROUND OF THE INVENTION

In my cited U.S. patent application Ser. No. 08/093,192, a hydraulic machine is disclosed as including a hydraulic pump unit and a hydraulic motor unit positioned in opposed, axially aligned relation with an intermediate, wedge-shaped swashplate. The pump unit is connected to an input shaft driven by a prime mover, while the motor unit is grounded to the stationary machine housing. An output shaft, coaxial with the input shaft and drivingly coupled to a load, is pivotally connected to the swashplate in torque coupled relation. When the pump unit is driven by the prime mover, hydraulic fluid is pumped back and forth between the pump and motor units through ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a pure hydrostatic component resulting from the differential forces created by the fluid pressures acting on circumferentially opposed end surfaces of the swashplate ports, which are of different surface areas due to the wedge shape of the swashplate.

To change transmission ratio, the angular orientation of the swashplate relative to the axis of the output shaft is varied. Since the transmission ratio, i.e., speed ratio, is continuously variable, the prime mover can run at a constant speed set essentially at its most efficient operating point. The availability of a 1:0 (neutral) transmission ratio setting eliminates the need for a clutch. Unlike conventional, continuously variable hydrostatic transmissions, wherein hydraulic fluid flow rate increases proportionately with increasing transmission ratio such that maximum flow rate occurs at the highest transmission ratio setting, the flow rate in the hydraulic machines disclosed in my cited U.S. applications reaches a maximum at a midpoint in the ratio range and then progressively decreases to essentially zero at the highest transmission ratio setting. Thus, losses due to hydraulic fluid flow are reduced, and the annoying whine of conventional hydrostatic transmissions at high ratios is avoided. By virtue of the multiple torque components exerted on the swashplate, the decreasing hydraulic fluid flow in the upper half of the output speed range, and the capability of accommodating an optimum performance prime mover input, the hydraulic machine of my cited application has a particularly advantageous application as a highly efficient, quiet, continuously variable hydrostatic transmission in vehicular drive trains.

SUMMARY OF THE INVENTION

An objective of the present invention is to provide improvements in the hydrostatic transmission disclosed in my cited U.S. application Ser. No. 08/093,192, to achieve economies in size, parts count and manufacturing cost.

An additional objective of the present invention is to provide improvements in the manner in which low pressure makeup hydraulic fluid is introduced to a hydrostatic transmission and the manner in which hydraulic fluid pressure is made available to a ratio controller on setting and changing transmission ratio.

A further objective of the present invention is to provide improvements in a controller for setting and changing the ratio of input speed to output speed of a hydrostatic transmission in a continuously (infinitely) variable manner. To achieve these objectives, the hydraulic machine of the present invention, in its application as a continuously variable hydrostatic transmission, comprises a housing; an input shaft journaled in the housing for receiving input torque from a prime mover; an output shaft journaled in the housing for imparting driving torque to a load; a hydraulic pump unit coupled to the input shaft; a hydraulic motor unit grounded to the housing; a wedge-shaped swashplate including ports extending between an input face confronting the pump unit and an output face confronting the motor unit; a coupling pivotally interconnecting the swashplate and the output shaft in torque-coupled relation; and a transmission ratio controller including a control cylinder positioned coaxial to the output shaft in surrounding relation to one of the pump and motor units, and a control piston movably mounted by the control cylinder and linked to the swashplate, such that axial movement of the control piston is converted to transmission ratio-changing pivotal motion of the swashplate about a pivot axis of the coupling.

Additional features, advantages, and objectives of the invention will be set forth in the description which follows and in part will be apparent from the description, or may be learned by practice of the invention. The objectives and advantages of the present invention will be realized and attained by the apparatus particularly pointed out in the following written description and the appended claims, as well as in the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention and, together with the description, serve to explain the principles of the invention.

BRIEF DESCRIPTION OF THE DRAWINGS

FIGS. 3 and 4 are plan views of opposed faces of a portplate seen in FIGS. 1 and 2.

3

Figure 1:
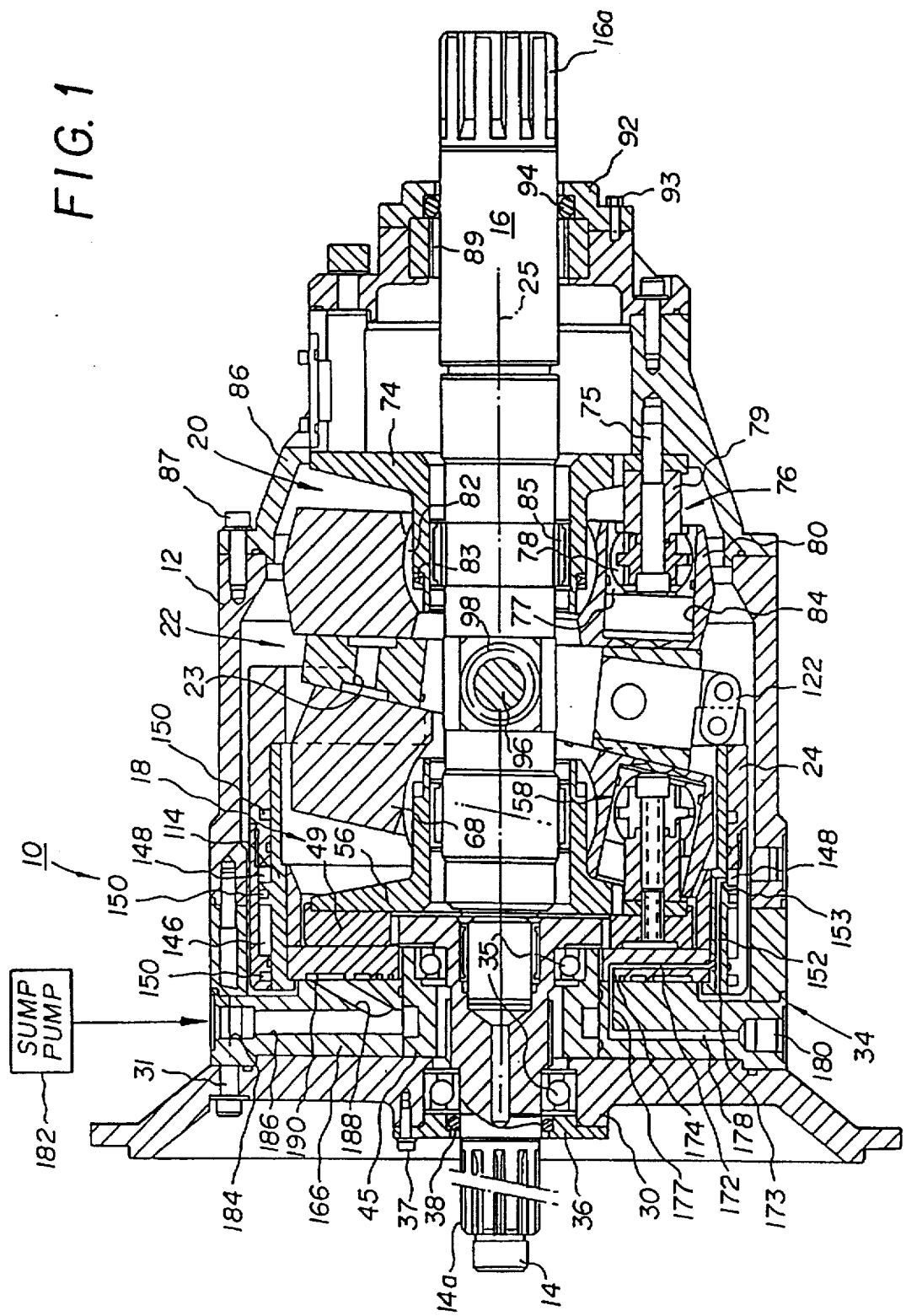
FIG. 1 is a longitudinal sectional view of a continuously variable hydrostatic transmission structured in accordance with a preferred embodiment of the present invention.
Figure 2:
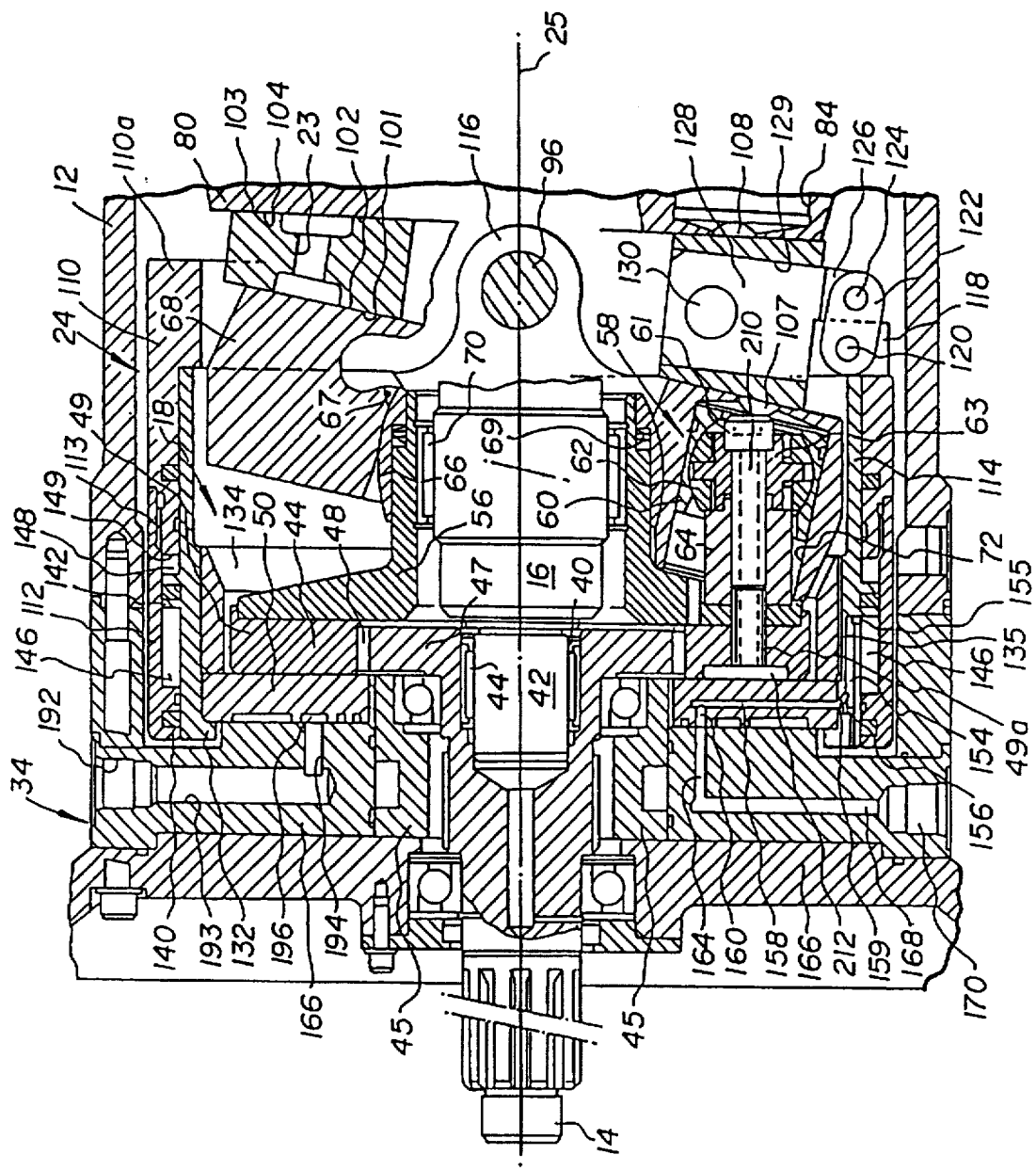
FIG. 2 is an enlarged fragmentary, longitudinal sectional view of the input end portion of the transmission of FIG. 1 that incorporates different sectional views of a manifold block.
Figure 6:
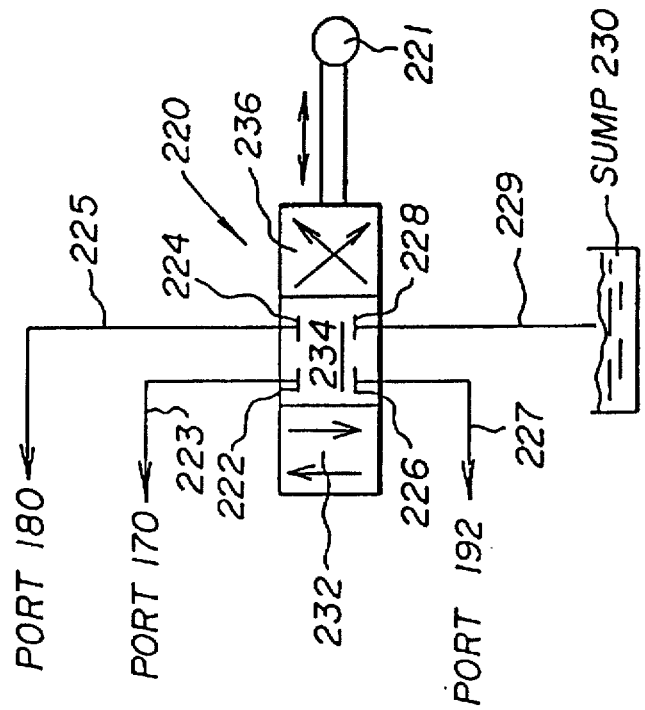

FIG. 6 is a schematic view of an external transmission ratio control valve utilized with the hydrostatic transmission of FIGS. 1 and 2.

Corresponding reference numerals refer to like parts throughout the several views of the drawings.

DETAILED DESCRIPTION OF THE PREFERRED EMBODIMENT

The continuously variable hydrostatic transmission according to the preferred embodiment of the present invention, generally indicated at 10 in the overall view of FIG. 1, comprises, as basic components, a housing 12 in which are journaled an input shaft 14 and an output shaft 16 in coaxial, generally end-to-end relation. The end of input shaft 14 external to the housing is splined, as indicated at 14a, to facilitate driving connection to a prime mover (not shown), while the end of output shaft 16 external to the housing is splined, as indicated at 16a, to facilitate driving connection to a load (not shown). Input shaft 14 drives a hydraulic pump unit, generally indicated at 18. A hydraulic motor unit, generally indicated at 20, is grounded to housing 12 in axially opposed relation to pump unit 18. A wedge-shaped swashplate, generally indicated at 22, is drivingly connected to the output shaft 16 in a position between the pump and motor units and is apertured, one aperture indicated at 23, to accommodate exchanges of hydraulic fluid between the pump and motor units. A control piston 24 is linked to swashplate 22 for the purpose of pivotally adjusting the angle of swashplate orientation relative to the output shaft axis 25, thereby adjustably setting the transmission ratio of the input shaft speed to the output shaft speed.

Now referring jointly to FIGS. 1 and 2 in greater detail, the cylindrical housing 12 includes a cover 30 secured in place by an annular array of bolts, one seen at 31, to close off the open input end of the housing. Input shaft 14 extends into housing 12 through central openings in the cover and a manifold assembly, generally indicated at 34, that is secured in place between the cover and housing by the bolts 31. Bearings 35, fitted in the cover and manifold assembly openings, journal the input shaft 14 for rotation. An annular end cap 36, affixed to cover 30 by bolts 37, holds a seal 38 against the input shaft peripheral surface to prevent leakage of hydraulic fluid.

As best seen in FIG. 2, the inner end of input shaft 14 is counterbored to provide a cylindrical recess 40 for receiving a reduced diameter inner terminal portion 42 of output shaft 16. A roller bearing ring 44, fitted in recess 40, provides inner end journal support for the output shaft. The inner terminal portion of input shaft 14 beyond a hub member 45 of manifold assembly 34 is flared to provide a radial flange 47 having a splined peripheral surface in meshed engagement with a splined central bore (commonly indicated at 48) of an annular thrust washer 49. An annular portplate 50 is positioned between manifold assembly 34 and thrust washer 49.

The right radial face of thrust washer 49 is recessed to receive the radially flared left end portion of a carrier 56 for a plurality of pistons included in hydraulic pump unit 18. These pistons, for example, ten in number with one being generally indicated at 58, are uniformly distributed in a circular array concentric with output shaft axis 25 in the manner disclosed in my cited patent applications. As illustrated in FIG. 2 herein, each pump piston 58 includes a piston head 60 mounted to the piston carrier 56 by an elongated bolt 61 extending through a hole in the piston carrier and threaded into a tapped hole in thrust washer 49,

4 as indicated at 49a. Piston head 60 is machined to provide a spherical inner surface conforming to a spherical outer surface of an annular bearing 62 keyed on a bushing 63 carried by bolt 61. A standoff sleeve 64 is also carried on bolt 61 such that, when the bolt is tightened down, bushing 63 is clamped in place to appropriately position bearing 62 and piston head 60 in axially spaced relation to piston carrier 56. As a result, each piston head 60 is mounted for limited radial and swivel motions.

The cylindrical right end portion of pump piston carrier 56 carries an annular spherical bearing 66 conforming to a spherical surface 67 machined in the central opening of an annular pump cylinder block 68. An annular compression spring 69 acting against axially opposed shoulders provided on carrier 56 and spherical bearing 66 urge the spherical bearing rightward toward the output end of transmission. A roller bearing ring 70 is confined in the central opening of pump piston carrier 56, through which output shaft 16 extends, to provide journal support for pump piston carrier 56. Cylinder block 68 includes an annular array of pump cylinders 72 for respectively receiving the pump pistons 58. By virtue of the spherical bearing mountings of pump piston heads 60 and pump cylinder block 68, precessing motion of the pump cylinder block axis relative to output shaft axis 25 is accommodated.

Returning to FIG. 1, hydraulic motor unit 20 is essentially structurally equivalent to hydraulic pump unit 18. However, an annular motor piston carrier 74, equivalent to rotating pump piston carrier 56, is instead fixed (grounded) to housing 12 by an annular array of bolts 75. These bolts also serve to mount motor pistons, generally indicated at 76, each including a piston head 77 swivel mounted on a spherical bearing 78 positioned in standoff relation to pump piston carrier 74 by a sleeve 79 in the same manner as pump pistons 58. A motor cylinder block 80 is then swivel mounted on carrier 74 via an annular spherical bearing 82. An annular compression spring 83 urges spherical bearing 82 leftward toward the input end of transmission 10. Again, as in the case of pump cylinder block 68, a circular array of motor cylinders 84 are formed in cylinder block 80 to respectively receive motor pistons 76. Since motor unit 20 is grounded to housing 12 by bolts 75, the motor pistons 76 and cylinder block 80 do not rotate, however, the spherical bearing mountings of motor piston heads 77 to bolts 75 and motor cylinder block 80 to carrier 74 accommodate nutating (precessing) motion of the motor cylinder block axis.

As further seen in FIG. 1, output shaft 16 extends rightward through the central opening in motor piston carrier 74, where a supporting roller bearing ring 85 is positioned, and out of housing 12 through a central opening in a hub-shaped output end closure 86 affixed to housing 12 by bolts, one seen at 87. A roller bearing ring 89, positioned in the end closure central opening provide further journal support for the output shaft. An annular end cap 92, affixed to end closure 86 by bolts 93, confines a seal 94 against the surface of output shaft 16 at the point of final exit from the housing to prevent leakage of hydraulic fluid.

Swashplate 22 is drivingly connected to output shaft 16 in operative position between pump unit 18 and motor unit 20 by transverse pins 96 respectively received in diametrically opposed hubs 98 affixed to the output shaft. The common axis of pins 96, orthogonal to the output shaft axis 25, constitutes a pivot axis for swashplate 22 to accommodate transmission ratio-change adjustment of the swashplate angular orientation relative to the output shaft axis 25.

Returning to FIG. 2, swashplate 22 includes an input face 101 in intimate sliding contact with face 102 of pump cylinder block 68 and an output face 103 in intimate sliding contact with face 104 of motor cylinder block 80. The input and output faces of swashplate 22 are relatively oriented at an acute angle to provide the wedged shape of the swashplate. Ports 23 extend between the input and output faces of the swashplate and communicate with respective openings 107 into cylinders 72 of pump cylinder block 68 and respective openings 108 into the cylinders 84 in motor cylinder block 80, all as more fully described and illustrated in my cited patent applications.

Ratio control piston 24 comprises a rightward cylindrical section 110 and a leftward cylindrical section 112 that are joined essentially end to end by screw threads 113. The ratio control piston 24 is slidingly mounted on a control cylinder 114 that is provided with a pair of diametrically opposed, rightwardly extending ears 116 having apertures through which the swashplate pivot pins 96 extend. The output end of piston section 110 is formed with a pair of closely, angularly spaced tangs 118 that are apertured to mount the ends of a pin 120, which, in turn, pivotally mounts one end of a link 122 positioned between tangs 118 in closely spaced relation. The other end of link 122 is pivotally connected to a pin 124 that is carried by a pair of closely, angularly spaced tangs 126 in flanking relation to the link. Tangs 126 are radially outward projections of a connector block 128 that is fitted in a recess 129 formed in swashplate 22 and held in place by a transverse locking pin 130.

It is thus seen that axially reciprocating movement of control piston 24 is translated into angular motion of the swashplate as it pivots about its pivotal connection (pins 96) to output shaft 16. It is also seen that, by virtue of this connection and the connection of control cylinder ears 116 to the swashplate pivot pins 96, control piston 24 and control cylinder 114 rotate in unison with output shaft 16. A free end segment 110a of control piston section 110 is machined to provide an annularly distributed balancing mass for the purpose of counterbalancing the eccentric masses of the swashplate 22, and the precessing pump cylinder block 68 and motor cylinder block 80, as fully explained in my U.S. patent application Ser. No. 08/093,192.

Still referring to the enlarged view of FIG. 2, the left end of control cylinder 114 is formed with a radially inwardly extending lip 132 that serves as an axial stop to engage portplate 50 assembled within the control cylinder in a press-fit manner. A clamping ring 134, having a threaded periphery engaging an internal threaded section 135 of control cylinder 114, is turned down to securely clamp portplate 50 against lip 132. Thus, annular portplate 50 also rotates in unison with output shaft 16.

The left end of control piston section 112 is machined to provide an annular shoulder 140 that projects radially inward into sliding engagement with the peripheral surface of control cylinder 114. The control cylinder is machined to provide an annular shoulder 142 projecting radially outward into sliding engagement with an inner cylindrical surface of control piston section 112. The space between control piston section 112 and control cylinder 114 that is axially defined by the opposed shoulders 140 and 142 provides an annular control chamber 146. Another annular control chamber 148 is provided by the radial spacing between the control cylinder and control piston section 112 that is axially defined by shoulder 142 and the input (left) end surface 149 of piston section 110. Seal rings 150 are incorporated in shoulders 140 and 142 and piston section 110 to prevent hydraulic fluid leakage from chambers 146 and 148.

At angularly spaced locations, longitudinal bores are drilled into the left end of control cylinder 114 to provide fluid passages 152 (FIG. 1) and 154 (FIG. 2). Passage 152 terminates in a radial passage 153 to the output (right) side of shoulder 142 and thus opens into chamber 148. Shorter passage 154 terminates in a radial passage 155 on the left (input) side of shoulder 142 and thus opens into chamber 146. The outer ends of passages 152 and 154 are plugged, as indicated at 156 in FIG. 2. As seen in FIG. 2, passage 154 communicates with a radial passage 158 drilled in portplate 50 via a short connector passage 159 drilled in control cylinder 114. The inner end of radial passage 158 communicates with a longitudinal passage 160 that, in turn, communicates with a shallow annular cavity 162 formed in the input radial face 163 of portplate 50, as also seen in FIG. 3. At a radius equal to that of cavity 162, a longitudinal passage 164 is drilled into an annular manifold block 166 press-fitted on hub 45 of manifold assembly 34. The left end of longitudinal passage 164 opens into a radial passage 168, whose outer end terminates at a port 170 in manifold block 166.

In the same manner and as illustrated in FIG. 1, longitudinal passage 152 in control cylinder 114 communicates with a radial passage 172, drilled in portplate 50, via a short connector passage 173 in control cylinder 114. The inner end of radial passage 172 communicates with a longitudinal passage 174 that opens into a shallow annular cavity 175 machined in the input radial face 163 of portplate 50 (FIG. 3). A longitudinal passage 177 is drilled into the right face of manifold block 166 at a radius equal to that of cavity 175. The inner end of passage 177 opens into a radial passage 178, whose outer end terminates at a port 180 in the manifold block.

It is seen that, although portplate 50 rotates with the output shaft and manifold block 166 is grounded to housing 12 by bolts 31, the annular cavities 162 and 175 in the portplate provide continuous fluid communication between the longitudinal passage 160 and 164 and between longitudinal passages 174 and 177, regardless of the angular relation of the rotating portplate and stationary manifold block. Thus, during transmission operation, port 170 is in continuous fluid communication with chamber 146, and port 180 is in continuous fluid communication with chamber 148.

To ensure an adequate supply of makeup hydraulic fluid from a sump pump 182, three additional ports are formed in manifold block 166 at 120° angularly spaced positions. One of these makeup ports is illustrated in FIG. 1 at 184. Each makeup port communicates with a radial passage 186 drilled in manifold block 166, which, in turn, communicates with an angular passage 188 that opens into the right radial face of the manifold block in confronting relation with an outermost semi-annular cavity 190 machined into the left radial face 163 of portplate 50, as seen in FIG. 3. A final manifold port 192, seen in FIG. 2, communicates with a radial passage 193 in manifold block 166, which, in turn, communicates with a longitudinal passage 194 that opens into the right radial face of the manifold block in confronting relation with an annular cavity 196 machined in portplate face 163 (FIG. 3).

Figure 5:
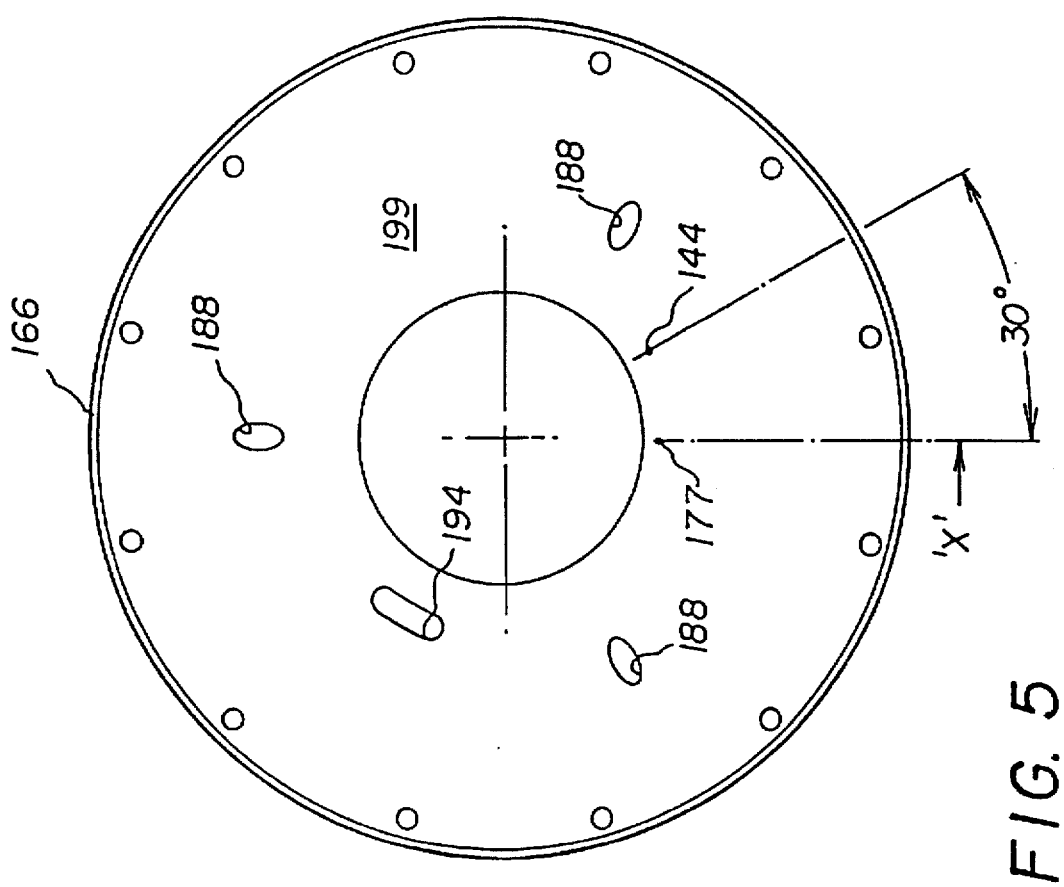
FIG. 5 is a plan view of one face of a manifold block seen in FIGS. 1 and 2.

The relative angular and radial positionings of the manifold passages at the right radial face 199 of manifold block 166 are illustrated in FIG. 5. It is pointed out that the sections of manifold block 166, portplate 50 and control cylinder 114 illustrated in FIGS. 1 and 2 have been chosen to best illustrate the hydraulic fluid flow relationships of the various passages therein, and thus do not represent their actual angular relationships, which, in the case of manifold block 166, can be seen in FIG. 5.

The right radial face 200 of portplate 50, seen in plan view in FIG. 4, is machined to provide a pair of diametrically opposed, semi-annular (kidney-shaped) surface cavities 202 and 204. A pair of kidney-shaped ports 206 provide fluid communication between cavities 190 and 202 through portplate 50, while a pair of kidney-shaped ports 208 provide fluid communication between cavities 204 and 196, as also seen in FIG. 3.

Returning to FIG. 2, the pump piston mounting bolts 61 are drilled with axial bores 210 (illustrated in phantom line), such that the fluid pressures in the pump cylinders 72 are communicated to separate recesses 212 formed in the left radial face of thrust washer 49 bearing against the right face 200 (FIG. 4) of portplate 50. Thus, the pump cylinder fluid pressures are communicated to surface cavities 202 and 204 in portplate face 200 and then to surface cavities 190 and 196 in portplate face 163 (FIG. 3) via ports 206 and 208.

When the pump pistons 58 and pump cylinders 72 revolve from the thinnest point of the wedge-shaped swashplate 22 around to its diametrically opposed thickest point, the volumes of the associated pump cylinders progressively decrease, and the hydraulic fluid in these pump cylinders is therefore being pressurized. This is considered to be the high pressure or pumping side of hydraulic pump unit 18.

When, the pump pistons and pump cylinders revolve from the thickest point around to the thinnest point of the swashplate 22, the volumes of the associated pump cylinders 72 are progressively expanded. This is considered to be the low pressure or suction side of the hydraulic pump unit 18.

Since portplate 50 and swashplate 22 rotate in unison, because both are tied to output shaft 16, the angular relationships of the portplate surface cavities to the high pressure (pumping) and low pressure (suction) sides of pump unit 18, as determined by the swashplate, remain fixed regardless of input to output shaft speed ratio. The angular orientation of portplate 50 relative to the swashplate is such that the hydraulic fluid in portplate surface cavities 190 and 206, introduced from by the sump pump 182 through manifold block ports 184 and passages 186, 188, assumes the average fluid pressure in the pump cylinders 72 involved in the suction side of pump unit 18 by virtue of the fluidic connections provided by bores 210 in the pump piston mounting bolts 61. The provision of three makeup passages 188 spaced 120° apart guarantees that at least two makeup ports are always in fluid communication with the 180° arcuate surface cavity 190 in the left radial face 163 of portplate 50 (FIG. 3). Consequently, starvation of hydraulic fluid in pump unit 18 is prevented.

On the other hand, hydraulic fluid, that has filled portplate surface cavities 196 and 204 through the bores 210 in the pump piston mounting bolts 61, is pressurized to an average of the fluid pressures in the pump cylinders 72 involved in the high pressure (pumping) side of pump unit 18. As described above, the high pressure hydraulic fluid in portplate cavity 196 is in flow communication with port 192 through manifold passages 193 and 194.

A ratio control valve 220, such as illustrated in FIG. 6, is provided to stroke (change) transmission 10 through a limited reverse speed range of acute swashplate angles counterclockwise of a swashplate input (left) face 101 angle normal to the output shaft axis 25 that produces a neutral (1:0) transmission ratio, through a forward speed range from neutral (1:0) to a 1:1 transmission ratio, where the swashplate output (right) face 103 is normal to axis 25, and beyond, into a limited overdrive speed range, as indicated by the swashplate angle illustrated in FIG. 2. A first valve port 222 is connected by a fluid line 223 to the manifold port 170 that is in fluid communication with control piston annular chamber 146, as seen in FIG. 2. A second valve port 224 is connected by a fluid line 225 to manifold port 180 that is in fluid communication with control piston annular chamber 148, as seen in FIG. 1. A third valve port 226 is connected by a fluid line 227 to manifold port 192 that is in flow communication with the high pressure hydraulic fluid in swashplate cavity 196, as seen in FIG. 2. The fourth and last valve port 228 is connected to a fluid line 229 returning to sump 230. Control valve operation is effected by reciprocating its valve spool, via operator 221, to a selected one of three valve positions indicated at 232, 234, and 236.

When ratio control valve 220 is in the valve position 234 illustrated in FIG. 6, all four valve ports are closed, allowing the fluid pressures in control piston chambers 146 and 148 to equalize. The axial position of control piston 110 is thus held steady by the balanced fluid pressures in the control chambers to set a desired transmission ratio. To decrease transmission ratio by pivoting swashplate 22 in the counterclockwise direction in FIGS. 1 and 2, control valve spool is moved leftward via operator 221 to establish the valve position 236, wherein valve port 226 is fluid connected to valve port 224 and valve port 222 is fluid connected to valve port 228. It is thus seen that high pressure hydraulic fluid flows into annular central chamber 148 and annular control chamber 146 is vented to sump 230. The fluid pressure in chamber 148 then exceeds the fluid pressure in chamber 146, causing the volume of chamber 148 to expand as the volume of chamber 146 contracts. Control piston 110 is thus propelled axially to the right, and swashplate 22 is pivoted in the counterclockwise direction by virtue of its linkage to the control piston provided by link 122. When the desired lower transmission ratio is achieved, operator 221 is moved rightward to reestablish the center valve position 234 and close off all of the valve ports. The fluid pressures in the control chambers 146 and 148 quickly equalize to set the new lower transmission ratio.

Then to increase transmission ratio, valve operator 221 is drawn to the right, such as to establish valve position 232 connecting valve port 226 to valve port 222 and valve port 224 to valve port 228. High pressure hydraulic fluid then flows into control chamber 146, as control chamber 148 is vented to sump 230. Control piston 110 is then propelled to the left, and swashplate 22 is pivoted in the clockwise direction. When the desired higher transmission ratio is achieved, the center valve position 234 is reestablished by operator 221. The fluid pressures in the control chambers 146 and 148 quickly return to balance, setting the new, higher transmission ratio.

It will be appreciated that, rather than a three-position spool valve, the ratio control valve may take the form of a pair of pulse width modulated solenoid valves, such as disclosed in commonly assigned U.S. application Ser. No. 08/380,269, filed Jan. 30, 1995, the disclosure of which is incorporated herein by reference.

From the foregoing description, it is seen that the present invention provides an infinitely variable hydrostatic transmission of the type disclosed in my cited application Ser. No. 08/093,192 that affords advantages of compact size, fewer parts and reduced manufacturing costs. While in the preferred embodiment disclosed above, the control piston 24 and control cylinder 114 are positioned in surrounding relation with pump unit 18, it will be appreciated that these elements may be positioned to surround motor unit 20. Portplate 50 and manifold block 166 would then be positioned to the output side of the motor unit in fluid communication with motor cylinders 84 through bores in the motor piston mounting bolts 75 in the manner disclosed in my cited application Ser. No. 08/342,472.

It will be apparent to those skilled in the art that various modifications and variations can be made to the apparatus of the present invention without departing from the spirit of the invention. Thus it is intended that the present invention cover modifications and variations thereof, provided they come within the spirit of the appended claims and their equivalence.

What is claimed is:

1. A continuously variable hydrostatic transmission comprising:

a housing;

an input shaft journaled in the housing for receiving input torque from a prime mover;

an output shaft journaled in the housing for imparting output torque to a load;

a hydraulic pump unit drivingly coupled to the input shaft;

a hydraulic motor unit fixed to the housing;

a wedge-shaped swashplate operatively positioned between the hydraulic pump and motor units and including ports accommodating hydraulic fluid transfers between the hydraulic pump and motor units, a coupling pivotally connecting the swashplate to the output shaft in torque-coupled relation; and a transmission ratio controller including:

a control cylinder positioned coaxial to the output shaft axis in surrounding relation to one of the hydraulic pump and motor units, a cylindrical control piston movably mounted by the control cylinder and linked to the swashplate, and first and second annular control chambers defined between the control cylinder and the control piston, such that hydraulic fluid pressure differentials in the first and second control chambers produce axial movement of the control piston that is converted to transmission ratio-changing pivotal motion of the swashplate about a pivot axis of the coupling.

2. The continuously variable hydrostatic transmission defined in claim 1, wherein the first and second control chambers are defined by radially and axially opposed surface portions of the control cylinder and control piston.

3. The continuously variable hydrostatic transmission defined in claim 2, wherein the control cylinder is connected to the coupling in fixed axial position while rotating in unison with the control piston, swashplate and output shaft.

4. The continuously variable hydrostatic transmission defined in claim 3, wherein the ratio controller further includes a control valve in fluid communication with the first and second chambers and selectively operable to create any one of the following conditions, 1) a hydraulic fluid pressure balance in the first and second control chambers to set an angular position of the swashplate to a desired transmission ratio, 2) a greater hydraulic fluid pressure in the first control chamber than in the second control chamber to pivot the swashplate about the pivot axis in a transmission ratio-increasing direction, and 3) a greater hydraulic fluid pressure in the second control chamber than in the first control chamber to pivot the swashplate about the pivot axis in a transmission ratio-decreasing direction.

5. The continuously variable hydrostatic transmission defined in claim 4, further including a link pivotally connecting a free end of the control piston to the swashplate at a location radially offset from the pivot axis.

6. The continuously variable hydrostatic transmission defined in claim 4, wherein the ratio controller further includes a hydraulic fluid circuit connecting the control valve to a source of pressurized hydraulic fluid in one of the hydraulic pump and motor units.

7. The continuously variable hydrostatic transmission defined in claim 4, further comprising:

an annular portplate coupled to rotate in unison with the output shaft and including fluid passages; and a manifold fixed to the housing and including fluid passages communicating with the portplate fluid passages, the portplate and manifold fluid passages arranged to provide separate hydraulic fluid circuit connections between the control valve and each of the first control chamber, the second control chamber, and a source of pressurized hydraulic fluid in one of the hydraulic pump and motor units.

8. The continuously variable hydrostatic transmission defined in claim 4, further comprising:

an annular portplate coupled to rotate in unison with the output shaft, the portplate including 1) a radial face having first and second radially offset, annular cavities therein, 2) a first fluid passage providing fluid communication between the first control chamber and the first annular cavity, and 3) a second fluid passage providing fluid communication between the second control chamber and the second annular cavity; and a manifold fixed to the housing, the manifold including 1) a radial face in sliding interfacial engagement with the portplate radial face, 2) first and second ports connected to the control valve by separate fluid lines, 3) a first fluid passage leading from the first port to a first opening in the manifold radial face aligned with the first annular cavity, and 4) a second fluid passage leading from the second port to a second opening in the manifold radial face aligned with the second annular cavity.

9. The continuously variable hydrostatic transmission defined in claim 8, wherein the portplate radial face further includes a third annular cavity radially offset from the first and second cavities and in fluid communication with a source of pressurized hydraulic fluid in one of the hydraulic pump and motor units, and the manifold further includes 1) a third port connected to the control valve by a fluid line, and 2) a third fluid passage leading from the third port to a third opening in the manifold radial face aligned with the third annular cavity.

10. The continuously variable hydrostatic transmission defined in claim 9, wherein the portplate radial face further includes a fourth cavity radially offset form the first, second and third cavities, the fourth cavity in fluid communication with the one of the hydraulic pump and motor units, and the manifold further includes 1) a fourth port connected to a source of makeup hydraulic fluid, and 2) a fourth fluid passage leading from the fourth port to a fourth opening in the manifold radial face positioned for fluid communication with the fourth cavity.

11. The continuously variable hydrostatic transmission defined in claim 10, wherein the third cavity is in fluid communication with a high pressure side of the hydraulic pump unit, and the fourth cavity is in fluid communication with a low pressure side of the hydraulic pump unit.

12. The continuously variable hydrostatic transmission defined in claim 1, wherein the hydraulic pump unit includes:

a cylinder block defining a circle array of pump cylinders, a carrier drivingly coupled to the input shaft, a plurality of pump pistons, each mounted to the carrier by a mount in a position slidingly received in a different one of the pump cylinders, the mounts having axial bores providing the fluid communication between the third cavity and those of the pump cylinders revolving in the high pressure side of the hydraulic pump and the fluid communication between the fourth cavity and those of the pump cylinders revolving in the low pressure side of the hydraulic pump unit.

13. The continuously variable hydrostatic transmission defined in claim 12, wherein the first, second, third, and fourth cavities are formed in a first radial face of the portplate, the portplate further including:

a second radial face opposite the first radial face, a fifth semi-annular cavity formed in the second radial face, a first plurality of the mount bores providing fluid communication between the fifth cavity and those of the pump cylinders revolving in the high pressure side of the hydraulic pump unit, a sixth semi-annular cavity formed in the second radial face in diametrically opposed relation to the fifth cavity, a second plurality of the mount bores providing fluid communication between the sixth cavity and those of the pump cylinders revolving in the low pressure side of the hydraulic pump unit, a first axial port providing fluid communication between the third and fifth cavities, and a second axial port radially offset from the first axial port and providing fluid communication between the fourth and sixth cavities.

14. A continuously variable hydrostatic transmission comprising:

a housing;

an input shaft journaled in the housing;

an output shaft journaled in the housing and having an axis;

a hydraulic pump unit including:
 a carrier drivingly coupled for rotation by the input shaft;
 a plurality of pump pistons mounted to the carrier in a circle array by respective mounts having through-holes, and
 a cylinder block defining a circle array of pump cylinders in which the pump pistons are respectively, slidingly received; a hydraulic motor unit including:

a carrier fixed to the housing, a plurality of motor pistons mounted to the carrier in a circle array, and
 a cylinder block defining a circle array of motor cylinders in which the motor pistons are respectively, slidingly received;

a wedge-shaped swashplate drivingly, pivotally connected to the output shaft in an operative position between the hydraulic pump and motor units and including ports accommodating pumping exchanges of hydraulic fluid between the pump and motor cylinders, the swashplate defining diametrically opposed high and low pressure sides of the hydraulic pump unit through which the pump cylinders revolve;

a controller coupled to adjust an angular orientation of the swashplate relative to the output shaft axis, thereby varying a transmission ratio of input to output shaft speed;

a manifold fixed to the housing, the manifold including:
 a radial face, and
 a plurality of first internal fluid passages terminating at a correspondingly plurality of angularly spaced, first openings in the radial face at equal radius position;

a portplate positioned between the manifold and the pump piston carrier and coupled to rotate in unison with the output shaft, the portplate including:
 a first radial face in interfacial sliding engagement with the manifold radial face,
 a semi-annular first cavity formed in the first radial face at a radius position corresponding to the radius positions of the first openings, such that, during rotation of the portplate relative to the manifold, fluid communication is maintained between the first cavity and at least one of the first openings,
 a second radial face opposite the first radial face,
 an arcuate second cavity formed in the second radial face at an angular position in fluid communication with those of the pump cylinders revolving in the low pressure side of the hydraulic pump unit via the pump piston mount through-holes, and
 a first axial port providing fluid communication between the first and second cavities; and a sump pump connected to the first internal passages to supply makeup hydraulic fluid to the pump cylinders revolving in the low pressure side of the hydraulic pump unit.

15. The continuously variable hydrostatic transmission defined in claim 14, wherein the manifold includes at least three first openings relatively angularly spaced such that makeup fluid communication is maintained between the first cavity and at least two of the first openings during rotation of the portplate relative to the manifold.

16. The continuously variable hydrostatic transmission defined in claim 14, wherein the manifold further includes at least one first peripheral port for connecting the sump pump to the first fluid passages.

17. The continuously variable hydrostatic transmission defined in claim 16, wherein the manifold further includes 1) a second peripheral port and 2) a second internal fluid passage leading from the second peripheral port to a second opening in the manifold radial face at a position radially offset form the first opening radius positions, and the portplate further includes 1) annular third cavity formed in the first radial face at a position in continuous fluid communication with the second opening, 2) an arcuate fourth cavity formed in the second radial face at a position in diametrically opposed relation to the second cavity and in fluid communication with those of the pump cylinders revolving in the high pressure side of the hydraulic pump unit via the pump piston mount through-holes, and 3) a second axial port providing fluid communication between the third and fourth cavities.

18. The continuously variable hydrostatic transmission defined in claim 17, wherein the transmission ratio controller includes:

a control cylinder positioned coaxial to the output shaft axis in surrounding relation to the hydraulic pump unit, and a cylindrical control piston movably mounted by the control cylinder and linked to the swashplate, such that axial movement of the control piston is converted to transmission ratio-changing pivotal motion of the swashplate about a pivot axis intersecting the output shaft axis in orthogonal relation.

19. The continuously variable hydrostatic transmission defined in claim 18, wherein the ratio controller further includes first and second annular control chambers defined between the control cylinder and the control piston, such that hydraulic fluid pressure differentials in the first and second control chambers produce the axial movement of the control piston.

20. The continuously variable hydrostatic transmission defined in claim 19, wherein the first and second control chambers are defined by radially and axially opposed surface portions of the control cylinder and control piston.

21. The continuously variable hydrostatic transmission defined in claim 20, wherein the control cylinder is fixed in axial position while rotating in unison with the control piston, swashplate and output shaft.

22. The continuously variable hydrostatic transmission defined in claim 21, wherein the manifold further includes 1) a third peripheral port, 2) a third internal passage leading from the third peripheral port to a third opening in the manifold radial face radially offset form the first and second openings, 3) a fourth peripheral port, and 4) a fourth internal passage leading from the fourth peripheral port to a fourth opening in the manifold radial face radially offset from the first, second and third openings, and the portplate further includes 1) a fifth annular cavity formed in the first radial face at a position in continuous fluid communication with the third opening, 2) a first internal fluid passage connecting the fifth annular cavity and the first control chamber in fluid communication, 3) a sixth annular cavity formed in the first radial surface at a position in continuous fluid communication with the fourth opening, and 4) a second internal fluid passage connecting the sixth cavity and the second control chamber in fluid communication.

23. The continuously variable hydrostatic transmission defined in claim 22, wherein the transmission ratio controller includes a control valve in separate fluid connections with the second, third and fourth peripheral ports and selectively operable to create any one of the following conditions, 1) a hydraulic fluid pressure balance in the first and second control chambers to set an angular position of the swashplate to a desired transmission ratio, 2) a greater hydraulic fluid pressure in the first control chamber than in the second control chamber to pivot the swashplate about the pivot axis in a transmission ratio-increasing direction, and 3) a greater hydraulic fluid pressure in the second control chamber than in the first control chamber to pivot the swashplate about the pivot axis in a transmission ratio-decreasing direction.

* * * * *

UNITED STATES PATENT AND TRADEMARK OFFICE
CERTIFICATE OF CORRECTION

PATENT NO. : 5,678,405
DATED : October 21, 1997
INVENTOR(S) : Lawrence Ray Folsom It is certified that error appears in the above-indentified patent and that said Letters Patent is hereby corrected as shown below:

Column 10, line 61 (claim 12, line 2) "1" should be --11--.

Signed and Sealed this

Thirtieth Day of December, 1997

Attest:

BRUCE LEHMAN

*Attesting Officer*          *Commissioner of Patents and Trademarks*